Patented Feb. 23, 1943

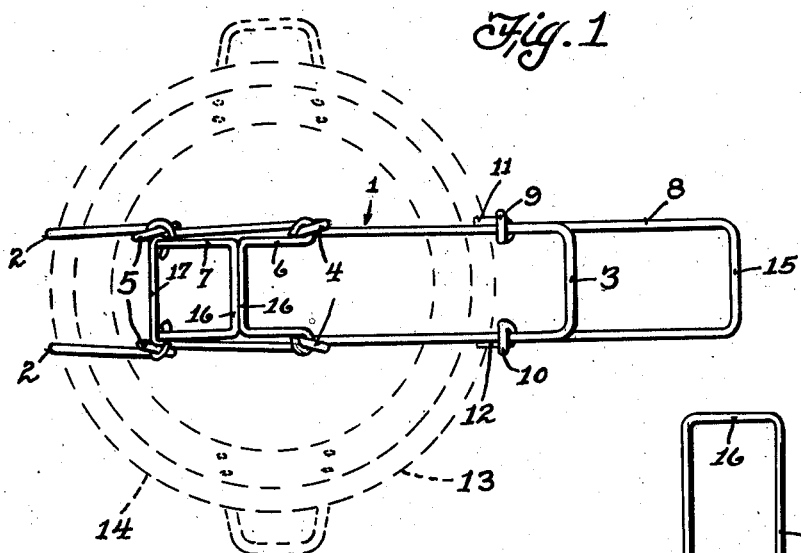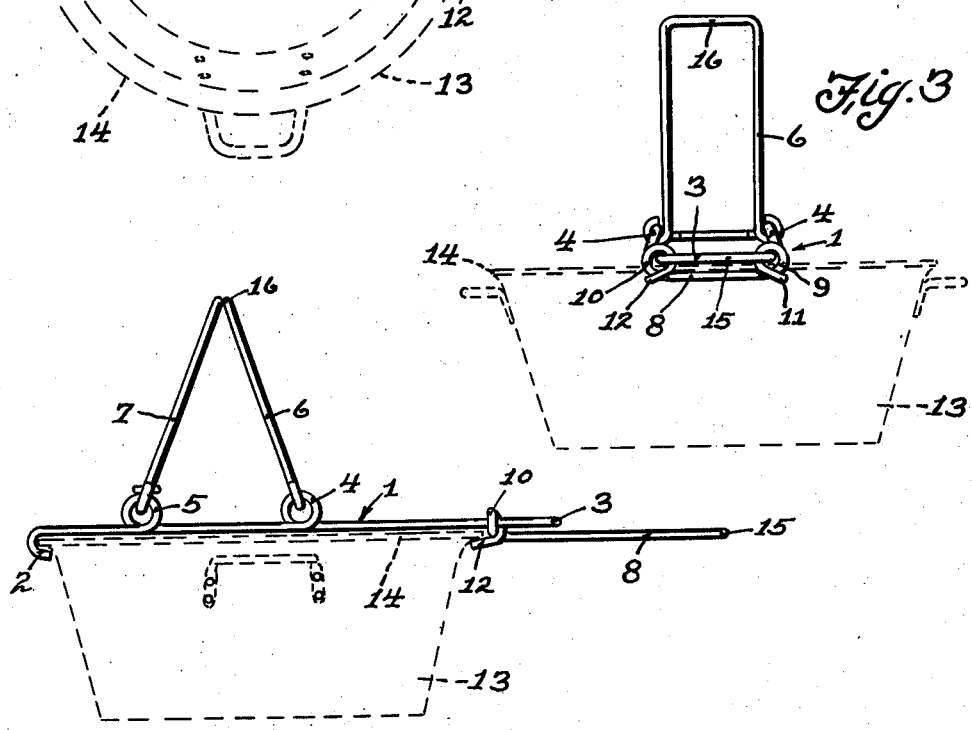

2,312,264

UNITED STATES PATENT OFFICE 2,312,264

HANDLE DEVICE

Melvin Theodore Rheingans, Milwaukee, Wis.

Application May 29, 1941, Serial No. 395,818

2 Claims. (Cl. 294—34)

This invention relates generally to improvements in handle devices.

One object of this invention is to provide a handle device adapted to be removably secured to a container whereby the container may be easily moved and controlled thereby, the handle device having parts movable relative to each other whereby the container may be securely engaged regardless of container size, the device being provided with handle members placed relative to each other to permit complete control of the container during movement thereof by means of the device.

Another object is to provide a handle device which is collapsible during non-use thereby permitting the device to be packaged and stored in a minimum of space.

A further object is to provide a handle device having widely spaced manipulative handle means, thereby increasing handling ability of the container by the operator.

A still further object is to provide a handle device having cooperatively related handle members collapsible into the primary plane of the device.

Yet another object is to provide a handle device which may be constructed entirely of rod-like stock; which is easy and efficient to use; and which is simple and effective in design.

In the accompanying drawing, in which I have illustrated preferred and practical embodiments of my invention:

Figure 1 is a top plan view of the handle device in container lifting position.

Figure 2 is a side view of the device shown in Figure 1.

Figure 3 is an end view of the device shown in Figure 1.

Like parts are indicated by the same reference numerals throughout the several views.

The handle device shown in the several views comprises a main body portion 1 formed of any suitable rod-like material, as for example wire of any suitable size and strength.

It has been found that a wire material is best suited for the construction of the device which construction comprises primarily the bending of the material into loops and at substantially right angles as clearly shown in the drawing.

The body portion 1 is bent in the form of a U having hook-like engaging or gripping ends 2, a yoke-handle 3 and pairs of oppositely disposed and spaced bail anchors 4 and 5 formed by looping the body portion 1 intermediate the ends thereof as shown.

Connected to the bail anchors 4 and 5 are U-shaped bails or handles 6 and 7 secured at their ends to the corresponding pair of anchors 4 and 5 by looping the ends of the handles 6 and 7 about the anchors as shown to provide a pivotal relationship therewith. It may be observed that by securing the handles 6 and 7 in this manner to the anchor loops 4 and 5, the handles are completely collapsible upon the body portion 1.

An adjustable handle 8 is slidably mounted on the body portion 1 by looping the handle 8 at 9 and 10 about corresponding sides of the body portion 1. As noted, the loops 9 and 10 terminate in container engaging portions 11 and 12 respectively.

The handle device is readily useable on any desired container as for example a cooking utensil 13 shown in broken lines, by first engaging the hook-like gripping ends 2 under the rim 14 of the utensil disposing the body portion 1 diametrically across the face of the utensil as shown in Figure 1 and moving the handle 8 on the body portion 1 until the portions 11 and 12 engage the utensil under the rim 14 opposite to the hook-like gripping ends 2. By gripping the yoke-handle 3 and the yoke portion 15 of the handle 8 in one hand and engaging the yoke portion 16 of the handles 6 and 7 in the other hand the utensil may be readily moved in an easy and safe manner.

It may be noted that when the U-shaped bail members are moved to operative position, shown in Figure 1, so that the yoke portions 16 are adjacent to each other, and the hand (not shown) of the operator firmly gripping the members by means of the yoke portions 16, the bail members are held against pivotal movement since the yoke portion 16 of each bail member is firmly held against movement relative to the other by the hand of the operator. Should one bail member be used in place of the two cooperatively related bail members as shown, less positive control would be realized over the container 13 since the one bail member would be free to rotate about the anchor means.

A brace 17 is looped into engagement with the looped end portion of the handle 7 to prevent spreading of the gripping ends of the body portion 1.

Containers of relatively smaller size may be lifted by means of the handle device because of the novel sliding arrangement of the handle portions 8 on the body portion 1. The device is placed in operative lifting position on a smaller container in the manner described with reference to the container 13. Where smaller containers are to be lifted it will be noted that the yoke portions 15 and 3 are disposed in a closer relationship to each other than is shown in Figure 1 for lifting a comparatively large container.

It may be noted that the handle device acts as a strainer or means for retaining the contents of the container in place while the container is tilted by means of the handle device to permit escape of the liquids contained therein.

When it is desirable to move containers in or out of restricted places, as for example an oven or a shelf (not shown), the handles 6 and 7 may be moved into their collapsed position in a plane adjacent the body portion 1, and by gripping the yoke portion 3 and 15 the container may be moved into the restricted place without hindrance due to handles projecting upwardly above the container.

Further, when it is desired to remove the container from a restricted place, the device with the handles 6 and 7 being in their collapsed position may be positioned on the container in the manner heretofore described. The container is then moved out from the restricted place. The handles 6 and 7 may then be moved into operative position and with two hands being used to carry the container move the container in a safe and controlled manner.

It is also to be noted that the greater the weight of the object to be lifted, as for example the container 13, the firmer will the yokes 15 and 3 be gripped by the hand of the operator thereby causing the gripping portions 11 and 12 of the handle element 8, and the gripping portion 2 of the body portion 1, to move toward each other and thereby cause the handle device to be more securely attached to the container.

It may still further be noted that when the object to be lifted by means of the handle device is too heavy for one person to carry, two or three persons may assist, wherein one person assists in carrying by means of the handle 7, a second by means of the handle 6 and a third by means of the handle 8.

From the foregoing drawing and description it is apparent that the objects of my invention have been attained by providing a handle device having collapsible handle portions; having adjustable means whereby objects of various sizes may be lifted; having means whereby the handle device is firmly held in gripping position regardless of the weight of the object to be lifted; and having collapsible handle portions adapted to be cooperatively related in a fixed position relative to each other during container moving operation.

Having thus described my invention, what I claim and desire to secure by Letters Patent is:

1. A handle device adapted to be removably attached to a container, said device including a U-shaped body member adapted to extend across one end of said container, gripping elements carried at one end of said member and a cross piece at the other end, spaced loop elements adjacent said gripping elements, a second U-shaped body member slidably interconnected with said first mentioned member and including gripping elements at one end and a cross piece at the other end thereof, said elements being movable to container gripping position by movement of said cross pieces toward each other, and bail members pivotally connected to said loop elements and cooperatively related to be held against movement relative to each other during container lifting operation of said device.

2. A handle device adapted to be removably attached to a container, said device including a U-shaped body member adapted to extend across one end of said container, a second U-shaped body member slidably interconnected with said first mentioned member, each of said members including gripping elements and a cross piece, loop element carried by said first mentioned member, said gripping elements being movable to container gripping position by movement of said cross pieces toward each other, and bail members pivotally connected to said loop elements and adapted to be held against movement relative to each other during container lifting operation and adapted to be moved into a plane substantially parallel to a plane immediately adjacent a plane including said first mentioned member.

MELVIN THEODORE RHEINGANS.